United States Patent
Holmes et al.

[15] 3,701,909
[45] Oct. 31, 1972

[54] PEAK AND HOLD SYSTEM

[72] Inventors: Walter V. Holmes, Morrisville, Pa.; John F. Renz, Cinnaminson, N.J.

[73] Assignee: Computer Test Corporation

[22] Filed: Aug. 17, 1970

[21] Appl. No.: 64,310

[52] U.S. Cl. .................307/246, 307/238, 307/251, 307/315, 328/151
[51] Int. Cl. .......................G11c 11/34, H03k 17/18
[58] Field of Search......307/238, 246, 255, 264, 251, 307/279, 288, 313, 315; 328/122, 151

[56] References Cited

UNITED STATES PATENTS

| | | | |
|---|---|---|---|
| 3,210,561 | 10/1965 | Ullman | 307/315 X |
| 3,363,113 | 1/1968 | Bedingfield | 307/238 |
| 3,479,528 | 11/1969 | Fisher | 307/238 X |
| 3,575,616 | 4/1971 | Jordan | 307/251 X |
| 3,586,880 | 6/1971 | Fitzwater | 307/238 |

Primary Examiner—Donald D. Forrer
Assistant Examiner—L. N. Anagnos
Attorney—Maleson, Kimmelman and Ratner and Allan Ratner

[57] ABSTRACT

A system and method for detecting the time of maximum amplitude of a bipolar unknown signal and generating a trigger pulse referenced to that time. The unknown signal is sampled at the time of the trigger pulse and the resultant sampled value is stored in short term storage. The short term stored value is transferred by control logic to long term storage where it remains available to be analyzed.

15 Claims, 7 Drawing Figures

INVENTORS
WALTER V. HOLMES
JOHN F. RENZ
BY
Maleson, Kimmelman + Ratner

ATTORNEYS

PEAK AND HOLD SYSTEM

BACKGROUND OF THE INVENTION

1. Field of the Invention

This invention relates to the field of art of analysis of an unknown signal.

2. Prior Art

It has been known in prior peak and hold systems to generate an output trigger pulse to mark the occurrence of a single peak of an unknown input signal. The trigger pulse is referenced in time to the actual occurrence of the unknown signal peak. The accuracy of the peak and hold system may be defined as a function of the consistency or precision of the time measurements between the actual occurrence of the unknown signal peak and the trigger pulse with varying amplitude unknown signals having the same peak time.

The foregoing accuracy is particularly important when the dynamic ranges of the unknown signals vary between 20 and 200 nanoseconds rise time and 80 and 1,000 millivolts amplitude. In these cases to obtain a precise output reading of the peak time, a substantially high accuracy, as for example, ±1.5 nanoseconds, is required.

For practical purposes such a high accuracy has not been obtainable in prior peak and hold systems. In addition, some prior systems have been limited by long time delays before being able to accept a new unknown signal and still maintain desired precision. These time delays decrease the analysis rate of the systems. In addition, some prior systems have been further limited in that they are unipolar and are not able to accept a bipolar signal and, in addition, require long delay lines thereby producing a slower operating instrument.

SUMMARY OF THE INVENTION

A system and method for sampling the unknown signal at the time of maximum amplitude. A short term storage is connected to an input of a first amplifier having applied thereto the sampled value of the unknown signal at the single referenced peak time. A first switch when switched on provides a negative feedback loop for the first amplifier. A second switch is connected between the output of the first amplifier and an input of a second amplifier and long term storage is connected to an input of the second amplifier. When the first switch is turned off and the second switch is turned on, a negative feedback loop is established around said first and second amplifiers and the stored sampled signal value is transferred from the short term to the long term storage. Following the transfer the long term storage has a value of charge proportional to the maximum amplitude of the unknown signal. The first switch is turned on and the second switch is turned off whereby a negative feedback loop is continuously established around said first amplifier to maintain that amplifier in an unsaturated state.

GENERAL DESCRIPTION OF SYSTEM 10

Figure 1:
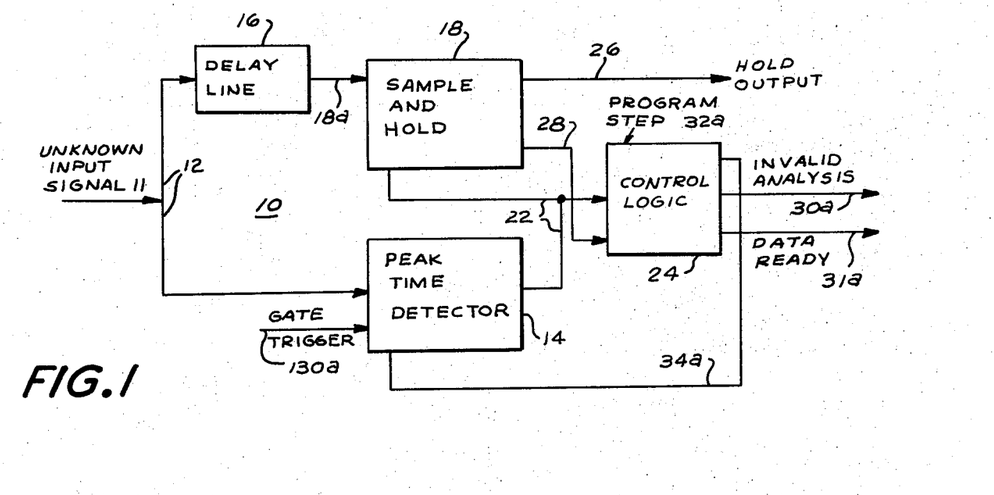
FIG. 1 illustrates a block diagram of system 10 embodying the invention.

Referring now to FIG. 1 there is shown a system 10 for finding and storing the peak value (maximum amplitude) of an unknown input signal 11. Unknown signal 11 may be nonrepetitive and generated in any well known manner. However, system 10 is particularly useful with unknown signals in the form of memory response voltage characteristics produced by a magnetic memory core tester or a plated wire memory tester. For example, a test method may involve driving a memory element to a known magnetic state and then measuring a response voltage characteristic, as applied to a sense amplifier, during a read operation.

Unknown input signal 11 is applied by way of input conductor 12 both to a peak time detector 14 and through a delay line 16 to an input 18a of a sample and hold circuit 18. Detector 14 is effective to detect the exact time of peak $t_p$ of signal 11. This peaking time $t_p$ of signal 11 is defined as the time at which the signal slope $dv/dt$ equals zero and the signal amplitude during this measurement period is at a maximum. Accordingly, detector 14 generates a trigger pulse 20 timed precisely (time referenced) at the peak time of unknown signal 11 and delayed with respect to signal 11 only by the propagation time through detector 14. Trigger pulse 20 is applied by way of conductor 22 to control logic block 24 and to sample and hold circuit 18.

Figure 2:
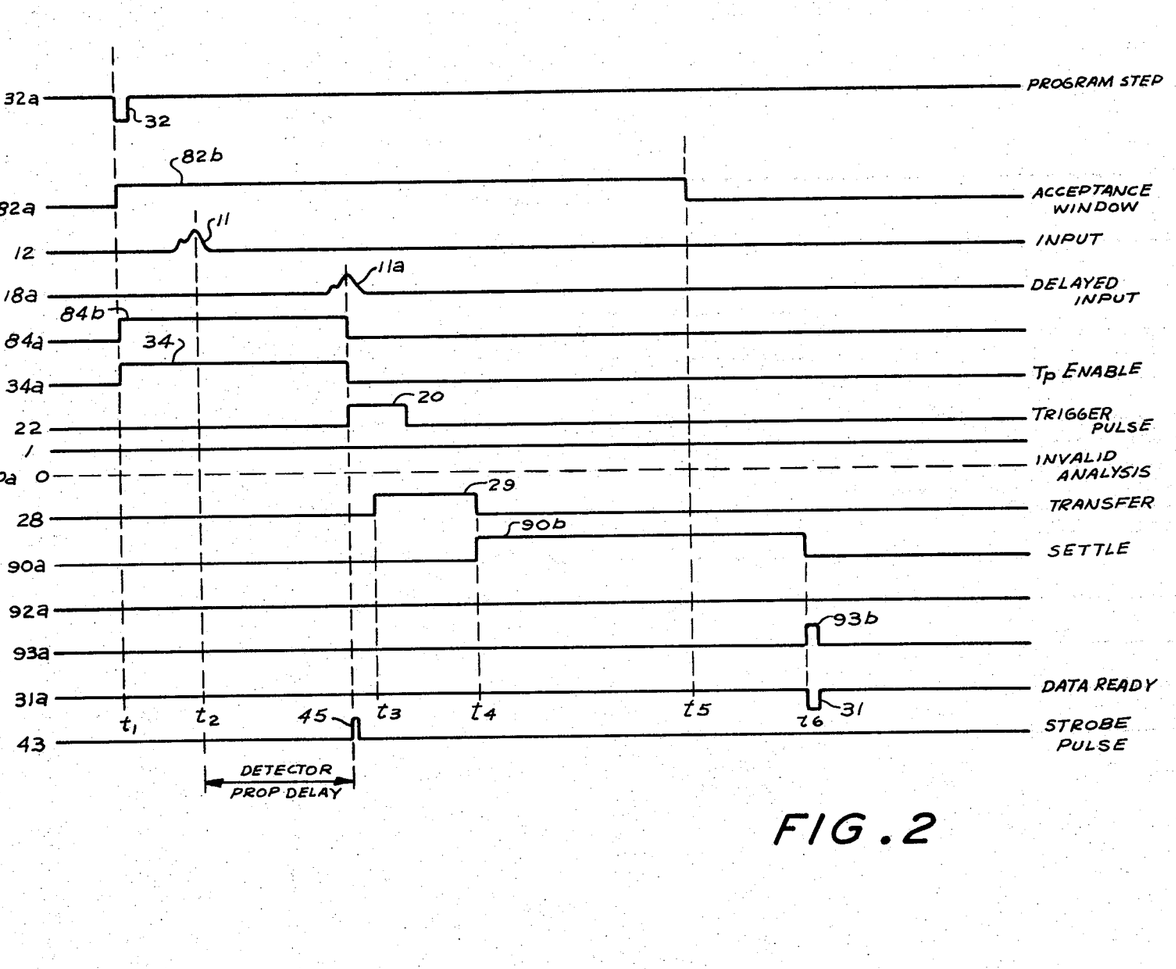
FIGS. 2 – 3 are waveform charts illustrating the operation of system 12.

It will be understood that line 16 is selected to precisely provide a delay time equal to the amount of time necessary to perform the peak detection operation of detector 14. Thus, as shown in FIG. 2, the leading edge of trigger pulse 20 occurs at the peaking time of delayed unknown signal 11a as it is applied from delay line 16 to input 18a of circuit 18. Accordingly, the leading edge of pulse 20 and the peak time of unknown signal 11 are applied simultaneously to circuit 18 which is effective to sample the peak amplitude of delayed signal 11a at the time of its peak. The peak amplitude after being sampled is transferred to a long term storage hold portion of circuit 18 which maintains a charge directly related in proportion to the magnitude of the peak amplitude. The charge being held is applied as a potential by way of output conductor 26 and is defined as the hold output of system 10.

The reason for the transfer from short term to long term storage is as follows. By transferring the short term stored value to long term storage, the short term capacitor is allowed to be discharged or cleared to an initial value. This clear operation occurs immediately following the transfer of the stored value. Thus, the short term storage is ready for a next sampling operation following a next program step pulse. In this manner, the short term storage capacitor is cleared of any residual charge from the previous storage so that the next storage value is an accurate representation of the amplitude of the unknown signal at that sample time only. Also a new input may be stored immediately following the interrogation of the long term capacitor and without requiring a further clear time thereby allowing accurate sample and hold operations at a high repetition rate. It is not necessary to provide a clear or discharge operation for the long term storage since there is provided a current source/sink combination which is effective to charge or discharge the long term storage capacitor as required.

At the completion of the foregoing transfer to the hold portion of circuit 18, a transfer signal 29 is applied from circuit 18 by way of a conductor 28 to trigger the control logic 24 to produce, after a predetermined delay, a data ready signal 31. The predetermined delay before generation of data ready signal 31 allows for the inherent settling of the hold output 26. After the delay, data ready signal 31 indicates that the hold output on conductor 26 is ready for further analysis.

To begin operation of system 10, a program step signal 32 is generated by a program generator system (not shown) and is effective to enable system 10 as well as the system (not shown) analyzing the hold output on conductor 26. Specifically in system 10, program step 32 is applied to control logic 24 which applies $T_p$ enable signal 34 by way of conductor 34a to peak time detector 14. In this manner, detector 14 is enabled and produces trigger pulse 20 in response to application to the detector of signal 11.

Program step signal 32 is effective within control logic 24 to switch an arming flip-flop to the 1 state and also to switch an acceptance one-shot circuit 82 to its quasi-stable state for 5 microseconds. As shown in FIG. 2, the switching of an arming flip-flop 84 and one-shot 82 occurs at time $t_1$.

As previously described, trigger pulse 20 is supplied by way of conductor 22 to control logic 24 and is effective to switch the arming flip-flop from the 1 state to the 0 state at time $t_p$.

At the termination of the quasi-stable state of the acceptance one-shot 82 at time $t_5$, the arming flip-flop has been switched to a 0 state. Thus gate 86 output on line 30a is in a 1 state and there is an absence of an invalid analysis signal which absence indicates that a measurement has been taken and the hold output 26 contains a measurement signal.

Figure 3:
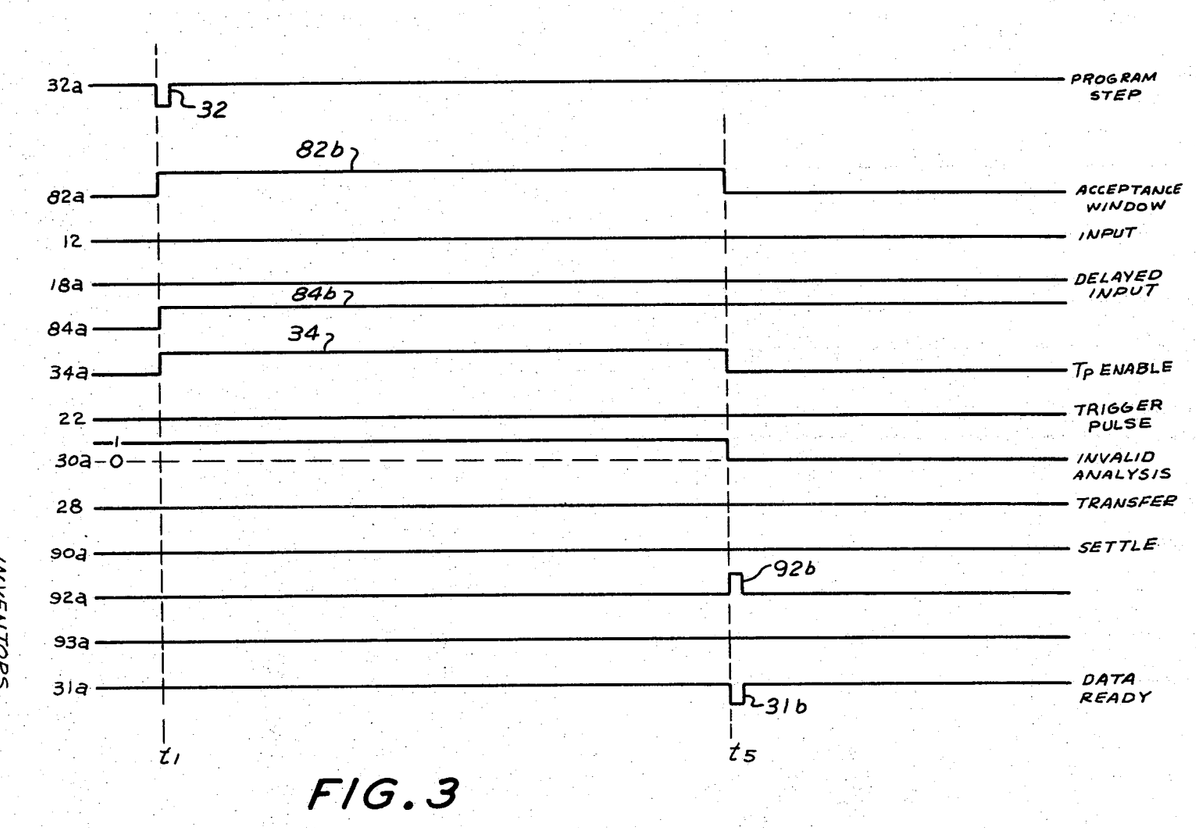

FIG. 3 shows the waveforms at the same circuit points as FIG. 2 except that an unknown input signal 11 does not appear and, therefore, a trigger pulse is not generated. As before, at time $t_1$ both the acceptance one-shot and the arming flip-flop are switched to their 1 state. However, the arming flip-flop is not switched as in FIG. 2, to its 0 state by time $t_4$ since the peak of signal 11 did not occur between times $t_1$ and $t_5$ and hence there is no trigger pulse on line 22. Thus, the arming flip-flop remains in its 1 state at the occurrence of the termination of the quasi-stable state which is effective to produce an invalid analysis signal defined as 0 at gate 86 output on line 30a. The invalid analysis signal indicates that the information on hold output 26 is not valid since no signal has occurred on line 12 and hence no measurement has been taken.

SAMPLE AND HOLD 18

Figure 4:
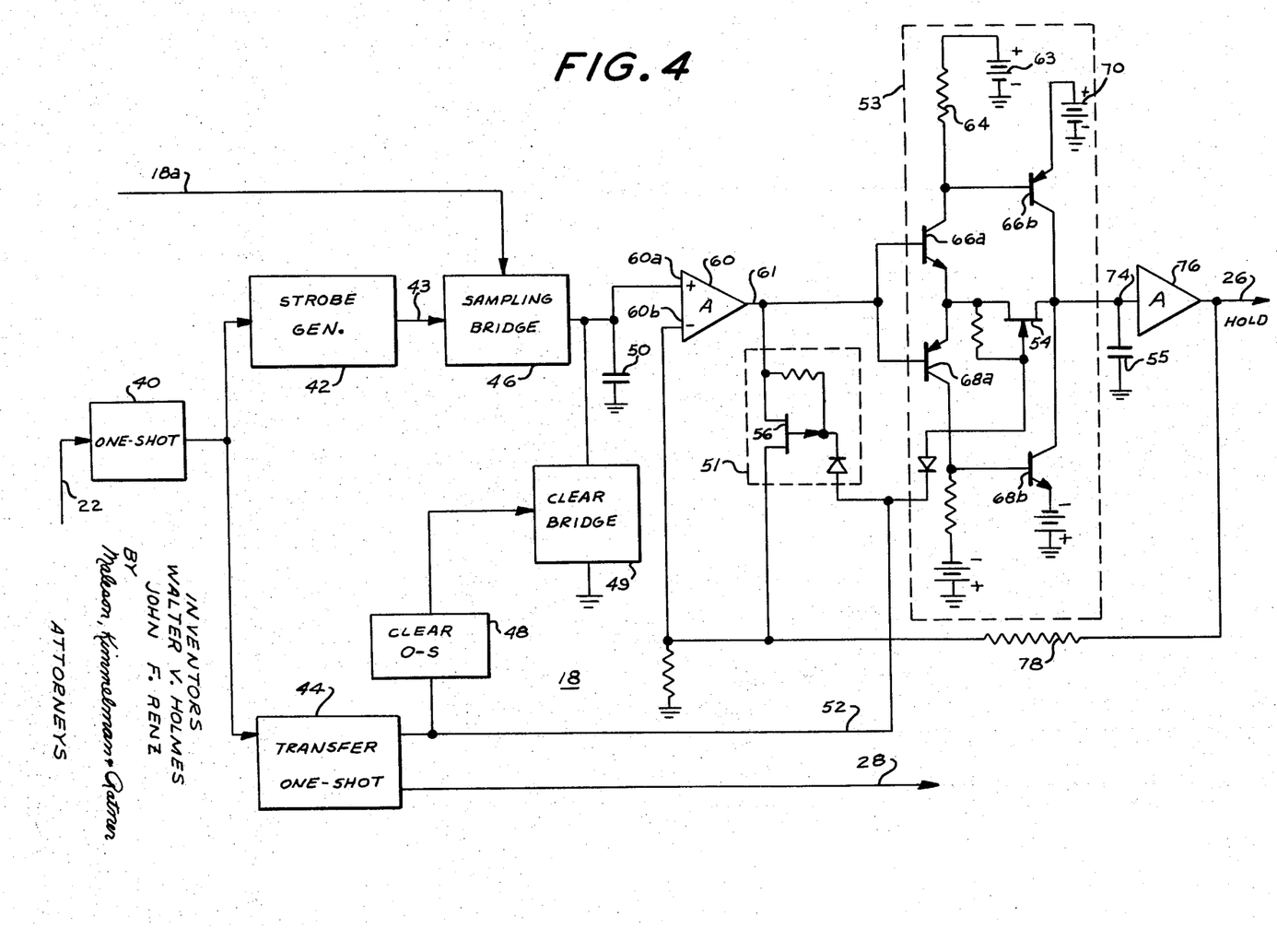
FIG. 4 illustrates in schematic and in part block diagram form sample and hold 18 of FIG. 1.

Referring now to FIG. 4, there is shown sample and hold circuit 18 in which trigger pulse 20 causes the circuit to sample the peak of delayed unknown signal 11a applied by conductor 18a. It will be understood that signal 11a is sampled at only a single time in response to pulse 20 and the resultant single sampled value is held. The leading edge of trigger pulse 20 is applied as a switching signal to a one-shot circuit 40. The switched output of one-shot 40 provides a rectangular waveshape having a sharp leading edge which is applied to strobe generator 42 which produces a sampling strobe pulse 45 of spike shape of 5 nanoseconds duration, for example. Pulse 45 is applied by way of conductors 43 to a diode sampling bridge 46 which is effective to allow the value of signal 11a during the 5 nanosecond sampling interval to be applied by way of input 18a to a short term storage capacitor 50 and one of the inputs 60a of differential amplifier 60. In this manner, the peak value of signal 11a as referenced by trigger pulse 20 is sampled and stored on capacitor 50.

The output 61 of amplifier 60 is connected (1) to switch 51 having normally on N-channel field effect transistor (FET) 56 and (2) to switch 53 having normally off P-channel FET 54. In the quiescent state, with FET 56 turned on, output 61 of amplifier 60 is connected to the other differential input 60b through the low impedance of FET 56 and feedback loop conductor 58. The closed feedback loop provides high negative feedback to differential input 60b and ensures that amplifier 60 remains in a nonsaturated state and further helps realize a high input impedance at differential input 60a. Accordingly, in the quiescent state, differential amplifier 60 provides a very high input impedance for the temporary storage capacitor 50.

The trailing edge of the pulse from one-shot 40 is effective to switch one-shot 44 to its quasi-stable state at time $t_3$ as indicated by the leading edge of pulse 29 which by way of conductor 52 turns on FET 54 and turns off FET 56 thereby to begin the transfer of the potential level on capacitor 50 to the long term storage capacitor 55. The feedback loop for amplifier 60 may now be traced by way of output 61 through a PNP-NPN pair of complementary Darlington transistors 68a–b or *alternatively through a NPN-PNP pair of complementary Darlington transistor 66a–b* and then by way of a conductor 74 through a high impedance noninverting amplifier 76, and a negative feedback resistor 78 to input 60b of amplifier 60. Thus, it will be understood that in all stages of operation, amplifier 60 is continuously embedded in a closed feedback loop and is thereby maintained in a nonsaturated state.

When the potential stored across short term capacitor 50 is of a more positive value than the potential across long term storage capacitor 55 (from a previous storage operation) then pair 66a–b operate to rapidly increase the potential level on capacitor 55. The feedback loop through feedback resistor 78 ensures that the final potential value across capacitor 55 is equal to the value across capacitor 50. Similarly, if the stored value on capacitor 50 is of a less negative value than that across capacitor 55 then pair 66a–b operates to change the value stored across capacitor 55 in a positive direction. It will be understood that in absolute terms, a more positive value is the same as a less negative value. The feedback loop through resistor 78 is effective to ensure that the final value across capacitor 55 is equal to that across capacitor 50.

The foregoing feedback loop will be described in more detail with respect to the upper complementary Darlington pair 66a–b for the transfer of a short term stored value on capacitor 50 which is more positive than the previous long term stored value on capacitor 55. Transistor 66b is only enabled when the current flow to long term storage capacitor 55 is greater than a predetermined level. Initially, current flow from amplifier 60 and conductor 61 through the base and emitter of transistor 66a is effective to turn on that transistor. Current flow then may be traced from battery 63 through resistor 64, transistor 66a and then through FET 54 to capacitor 55. When the foregoing current flow through resistor 64 is of sufficient magnitude, the potential drop across that resistor is sufficient to turn on transistor 66b. Accordingly, a high current flow may be traced from battery 70 through transistor 66b directly to capacitor 55. In this manner, a high current source of a complementary Darlington transistor is connected to the capacitor to charge it quickly to near the desired long term storage charge value as determined by the charge on capacitor 50. As the desired value is approached, the charging current flow decreases. Thus, negative feedback is effective to decrease the conductivity of transistor 66a thereby decreasing the potential drop across resistor 64 which turns off transistor 66b. Accordingly, the final charging current of capacitor 55 flows solely through FET 54 from battery 63. It will be understood that during the entire long term storage charge time FET 54 is turned on. However, during the high charge period transistor 66b provides the path for substantially greater current for the rapid charge of the capacitor.

By turning off transistor 66b prior to the termination of the charging of capacitor 55, there is avoided overshoot which may occur if a high current source is applied to the capacitor up to the time of termination. In this manner, there is provided compensation for time delay around the feedback loop to achieve a stable system without overshoot. Thus, by the use of a single switch, high charging currents may be easily controlled.

Another advantage of the foregoing operation is that the storage by long term storage capacitor 55 is performed under closed loop negative feedback operation. Any offsets that occur in any of the amplifiers 66 or 76 or paths within the loop are cancelled by the negative feedback.

When the value to be transferred from capacitor 50 is more negative than the previous long term stored value in capacitor 55, then Darlington pair 68a–b is enabled in the feedback loop. Operation is similar to that as described above except that a high current sink of complementary Darlington transistor 68b is connected to capacitor 55 to discharge that capacitor in a negative direction to near the desired long term storage charge value as determined by the charge on capacitor 50. It will now be understood that the pairs of Darlington transistors 66a–b and 68a–b provide for high charging or discharging current to capacitor 55 to change the value on the capacitor in either direction depending on the value stored on capacitor 50. Thus, a rapid charge is effected and the system is bipolar.

At time $t_4$, the quasi-stable state of circuit 44 terminates after 1.0 microsecond, for example, as indicated by the trailing edge of pulse 29. With this change in state, FET 54 is turned off, FET 56 is turned on and circuit 18 is switched to its quiescent state.

In this manner, the charging is terminated and capacitor 55 sees a turned off FET 54 as well as the collectors of Darlington transistors 66b and 68b, all of which provide a high impedance for maintaining the charge on capacitor 55. With FET 56 on, the feedback loop through the FET 56 is operational. Accordingly, long term storage is provided by capacitor 55 which is decoupled from any further changes in the short term storage capacitor 50. The trailing edge of pulse 29 is also effective by way of transfer output 28 to control logic 24 to produce a settling time pulse 90b which allows time for the analyzer system amplifiers connected to hold output 26 to settle with the long term charge being held. Accordingly, the hold output is not read by the analyzer system until the termination of settling pulse 90b (time $t_6$) when data ready pulse 31 is produced.

Further, the trailing edge of pulse 29 is effective to trigger a clear one-shot 48 to turn on a clear diode bridge 49. With bridge 49 on, a circuit path is provided to ground in shunt with capacitor 50 thereby allowing a rapid discharge of the short term storage capacitor 50. Bridge 49 is described in detail in patent application Ser. No. 65,388 for FREQUENCY INDEPENDENT SAMPLE AND HOLD by D. N. Lee et al. assigned to the same assignee as this invention. In this manner, sample and hold 18 is ready to sample the next delayed input signal upon application of the next trigger pulse 22.

CONTROL LOGIC 24

Figure 5:
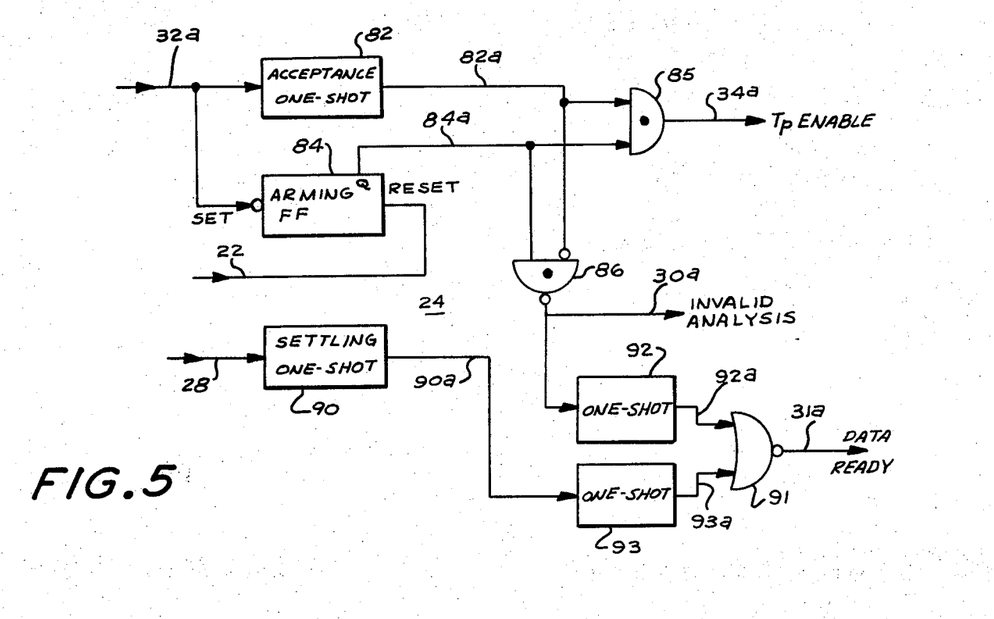
FIG. 5 illustrates in block diagram form control logic 24 of FIG. 1.

Control logic 24 is shown in detail in FIG. 5 and the associated waveforms in FIGS. 2 and 3. An acceptance one-shot circuit 82 is triggered at time $t_1$ by the falling edge of program step pulse 32 applied by way of conductor 32a. In this manner, one-shot 82 is set to its quasi-stable state to initiate acceptance window 82b. One-shot 82 as well as the other one-shots of control logic 24 are triggered to their quasi-stable state at the fall time of an input pulse. In addition, pulse 32 is inverted and applied to set an arming flip-flop 84 to its 1 state. Upon being switched, arming flip-flop 84 produces an output 84a, the leading edge of signal 84b. Signals 84b and 82b are applied to AND gate 85. Accordingly, the rising edge of signals 82b and 84b are ANDed to produce the rising edge of $T_p$ enable pulse 34 on line 34a which in turn is effective to enable peak time detector 14, FIGS. 1 and 6A.

At time $t_p$, the leading edge of trigger pulse 20 applied by way of line 22 is effective to reset arming flip-flop 84 from its previous 1 state to its 0 state as shown by pulse 84b. Since trigger pulse 20 indicates that a detection has been made, the 0 state output signal 84b from output 84a is effective at time $t_p$ to (1) disable AND gate 84 thereby terminating $T_p$ enable pulse 34 and (2) to disable gate 86 thereby preventing the application of an invalid analysis signal (a logic 0) on line 30a. On the other hand, if a detection were not made, gate 86 would not be disabled. At the termination of a 5 microsecond quasi-stable period from time $t_1 - t_5$, , the acceptance window 82b would return to the 0 state and enabled gate 86 would produce an invalid analysis signal (a logic 0) at time $t_5$ on line 30a.

If a peak were sampled as previously described, the trailing edge of transfer pulse 29 is applied by way of output 28 from one-shot 44 to switch settling one-shot 90 to its quasi-stable state at time $t_4$. Accordingly, a signal 90b is produced at output 90a of one-shot 90 of 5 duration, for example, 2.5 microseconds. At the termination of the quasi-stable state of one-shot 90 (time $t_6$) the trailing edge of pulse 90b is effective to trigger one-shot 93.

One shot 93 has a substantially short duration quasistable state to produce a pulse 93b at output 93a. Pulse 93b is applied through an OR gate 92 having an inverted output to produce on data ready line 31a, a data ready pulse 31 of 100 nanoseconds duration, for example. On the other hand, if there were no signal detected during acceptance window 82b, as shown in FIG. 3, at time $t_5$, an invalid analysis signal (0 state) is produced at output 30a by the falling edge of pulse 82b. In addition, the falling edge of that invalid analysis signal triggers one-shot 92 producing at output 92a, a pulse 92b which is applied by way of gate 91 to provide data ready pulse 31b on line 31a. A data ready pulse is required since the program generator system having armed system 10 with a program step 32 is therefore waiting for a data ready pulse.

PEAK TIME DETECTOR 14

Figure 6A:
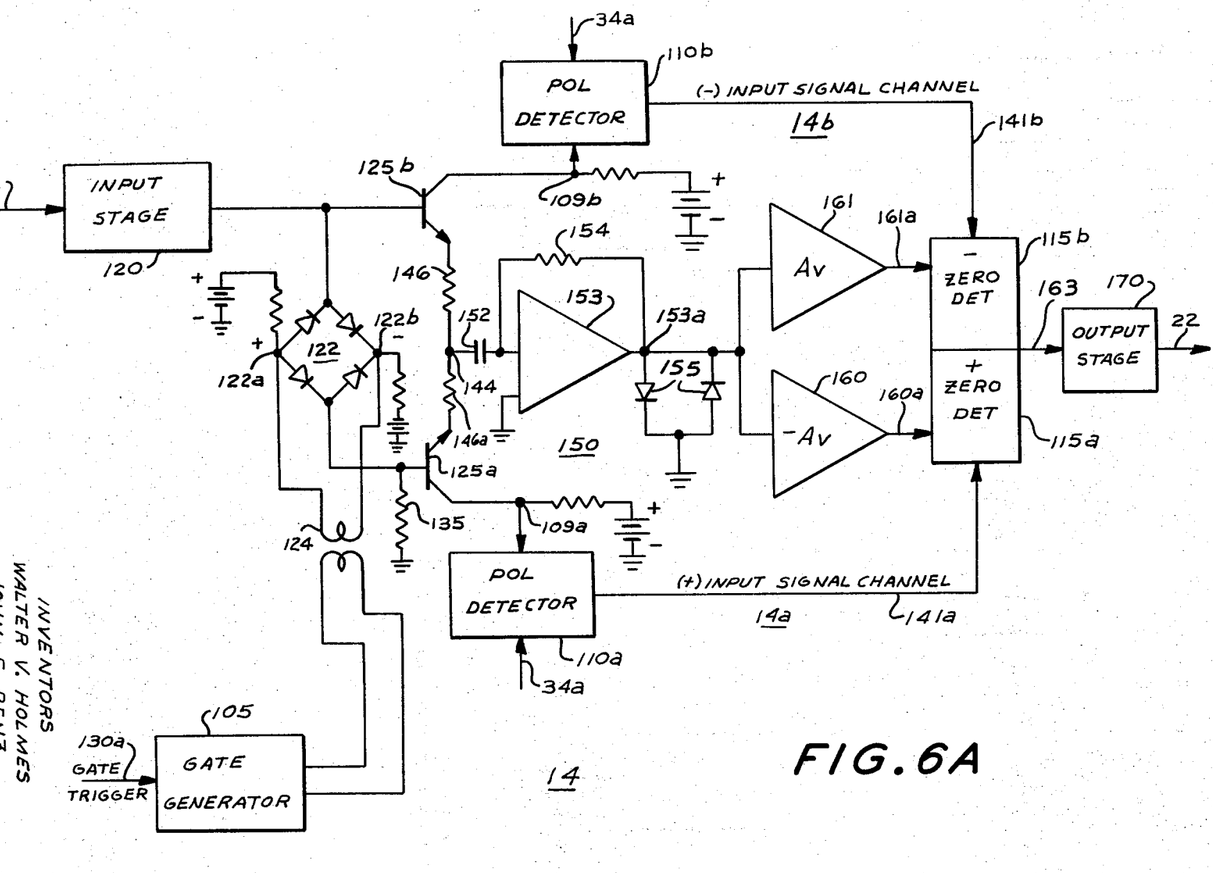
FIG. 6A illustrates in schematic and in part block diagram form peak time detector 14 of FIG. 1.
Figure 6B:
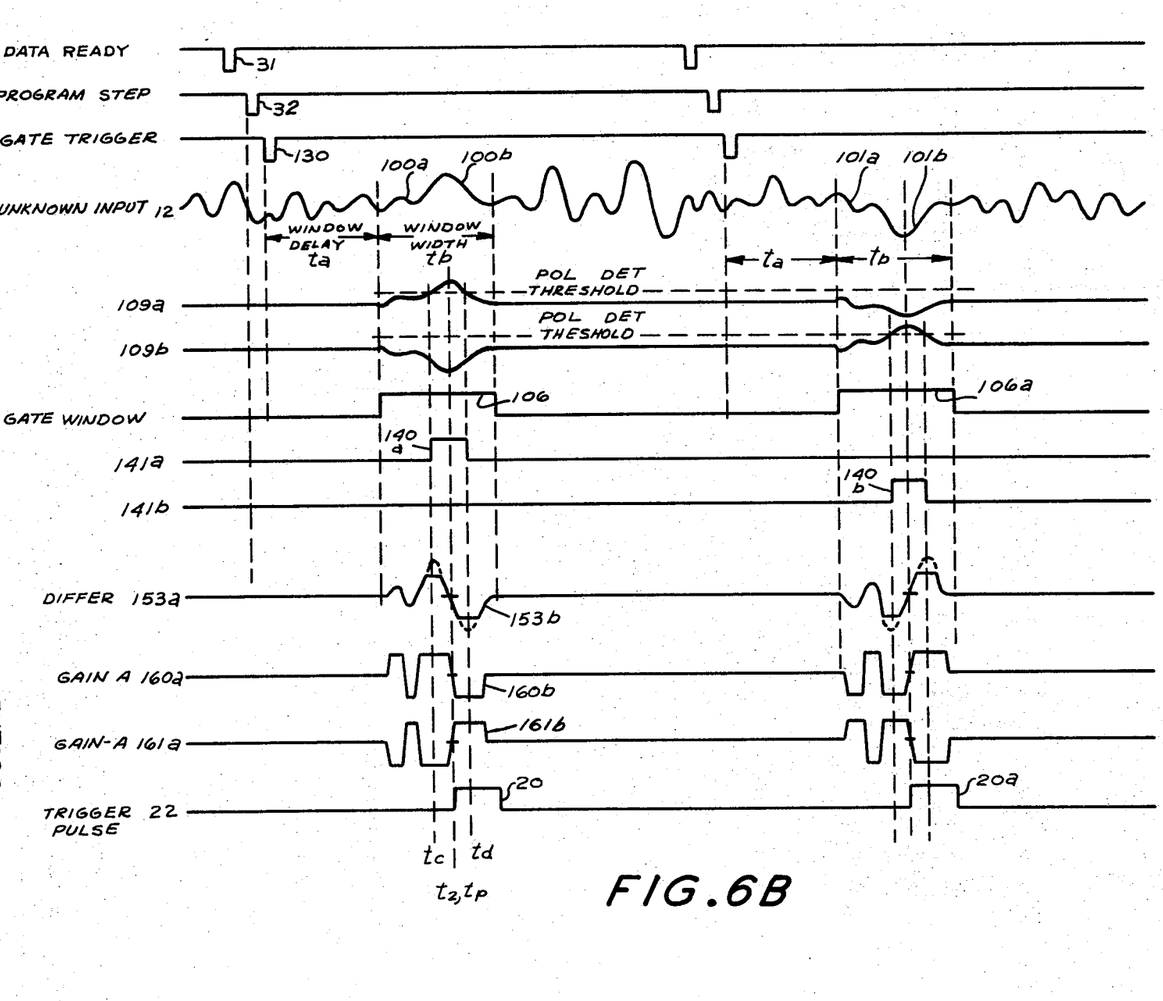
FIG. 6B is a waveform chart helpful in the explanation of FIG. 6A.

Referring now to FIGS. 6A–B, it will be understood that unknown input signal 11 on line 12 may, for purposes of explanation, comprise a composite of a signal to be measured 100b and a noise signal 100a as shown in FIG. 6B. Detector 14 automatically determines the peak time of the unknown signal regardless of polarity. As previously described, it is desired to analyze only for the peak contents of the unknown input signal 100b when detector 14 is armed by $T_p$ enable signal 34. The peak time of signal 100b (time $t_2$) is determined by detector 14 which detects the time of zero slope of signal 100b, viz., when $dv/dt$ is equal to zero. It will be understood that there are several points in time for signals 100a–b in which $dv/dt$ is equal to zero and it is desired to select only that point in time $t_2$ when signal 100b is the maximum value for determining the precise time of peak signal of 100b.

In order to achieve the foregoing, detector 14 includes a gate window 106 which is established by a gate generator 105 such that the window occurs only over the approximate time range of the peak to be analyzed. Detector 14 also comprises a positive and a negative polarity input pulse detector channel 14a and 14b, respectively. A positive polarity unknown input signal 100b having a value of greater magnitude in a positive direction than a predetermined threshold enables channel 14a during the time of gate window 106. Similarly, a negative unknown input signal 101b having a value of greater magnitude in a negative direction than a predetermined threshold enables channel 14b during the time of window 106a.

With regard to unknown signal 100b, when the input to polarity detector 110a exceeds in a positive direction a predetermined threshold, then a signal is generated allowing the detection of the time at which $dv/dt$ is equal to zero. The negative channel 14b operates similarly. For detector channel 14a, signal 100b is differentiated, clipped, then inverted and amplified. For channel 14b, signal 101b is differentiated and then only clipped and amplified. This enables zero detection circuits 115a–b to operate in the same direction for bipolar signals eliminating any possible hysteresis effect. Thus, there is achieved a high degree of noise immunity which allows the use of a differentiator 150 which ordinarily can not distinguish between desired signals and noise. Further, peak time detector 14 operates equally on both positive and negative going unknown signals.

A more detailed explanation of detector 14 will now be given. Unknown input signal 11 is applied to an input stage 120 which may comprise a limiter circuit followed in series by a driver. The output of stage 120 is applied (1) to the base of a transistor 206 which is one transistor of a differential transistor amplifier pair 206–7 and (2) by way of a diode bridge 122 to the base of transistor 207. Gate generator 105 normally maintains bridge 122 conductive by applying a signal by way of a transformer 124 to opposite legs 122a–b of bridge 122. Accordingly, the output of stage 120 is applied to both inputs of differential amplifier 206–7 and by common mode rejection the differential amplifier produces a null output.

At the first program step pulse 32 after a data ready pulse 31, a gate trigger pulse 130 is produced by the program generator system and supplied to generator 105 by way of line 130a. The operator views signal 11 on line 12 on an oscilloscope and adjusts gate generator 105 to select the starting time and pulse width of a gate window pulse 106 with time relation to trigger 130 so that pulse 106 has a width which narrowly overlaps desired unknown signal 11. Specifically, the operator selects time $t_a$ which is the time from pulse 130 to the initiation of pulse 106 and also selects time $tb$ which is the width of the pulse 106.

Gate window 106 is applied by way of transformer 124 to bridge 122 and is effective to turn off the bridge. Accordingly, the output of stage 120 is then only applied to a single differential input, viz., the base of transistor 125b. Thus, amplifier 125a–b produces an amplified input signal at the input of detectors 120a–b.

More particularly, in the normally on condition of bridge 122, transformer 124 applies a positive potential signal to junction 122a with respect to junction 122b causing the bridge diodes to conduct. In this manner, signal 11 is applied through the conductive diodes of the bridge to the base of transistor 125a. During gate window pulse 106, junction 122a becomes negative with respect to junction 122b. Accordingly, the diodes of bridge 122 are turned off and signal 11 is only applied to the base of transistor 125b while the base of transistor 125a is at a nominal ground potential as a result of the path through a small valued resistor 135 to ground.

As previously described, input signal 11 amplified by transistors 125a–b is applied noninverted to detector 110a and inverted to detector 110b. Detectors 110a–b have been enabled at time $t_1$ by $T_p$ enable signal 34; operate only on applied positive pulses; and have previously been set with predetermined amplitude threshold levels. These detectors are thus effective to produce a pulse on lines 141a–b, respectively, only when the applied signal is of the positive polarity and exceeds the selected threshold level. For example, for positive going input signal 11, signal 100a does not exceed the threshold and therefore detector 110a does not produce a pulse at that time. However, input signal 100b appears as a positive signal at 109a and exceeds a predetermined threshold at time $t_c$ remaining above the threshold until time $t_d$. As a result, detector 110a produces enabling detection pulse 140a indicating an applied positive polarity signal at time $t_c$. Detector 110b has no response since a negative signal is applied at junction 109b at time $t_c$. Pulse 140a is transmitted by way of line 141a to zero detector 115a and operates as an enabling signal to positive zero detector 115a. During this time, at junction 144 of emitter resistors 146a–b, a replica of input signal 11 is applied to the input of a differentiator 150. Differentiator 150 comprises in series circuit, a differentiating capacitor 162 and an operational amplifier 153 having a negative feedback resistor 154 with the output 153a of amplifier 153 being connected by way of a pair of clipping diodes 155 to ground. Output 153a is also connected by way of an inverting amplifier 160 of gain $-A_v$ to detector 115a and also by way of a noninverting amplifier 161 of gain $A_v$ to a negative zero detector 115b.

Accordingly, at output 153a, there is provided a differentiated and clipped output 153b of signal 11 during the gate window. Signal 153b is applied to amplifiers 160–1 and provides at the outputs thereof 160a and 161a, respectively, signals as illustrated in FIG. 6B. Only detector 115a has been enabled during pulse 100b and thus, this detector produces a pulse which is applied through a pulse shaping output stage 170 to form trigger pulse 20 at output 22 which begins at the time of the zero crossing of signal 160b and during pulse 140a. In this manner, only the peak of the signal is detected and not of noise pulse 100a.

In similar manner, the peak detection operation for a negative going input pulse 101a and noise pulse 101b may be accomplished. Since the input pulses are of negative polarity during the time of gate window 106a, positive polarity signals are applied now not to detector 110a but to detector 110b. Detector 110b, as detector 110a, only detects a positive polarity signal at junction 109b and thus provides a detection pulse 140b indicating that pulse 101b has exceeded the threshold. Accordingly, zero detector 115b is enabled to provided a zero detection for the output of amplifier 161 at the time of the zero crossing thereby forming pulse 20a.

It will be understood that for both signals 100b and 101b detectors 115a–b have detected a zero crossing as the signal goes from positive values to negative values through zero. In this manner, both detectors 115a–b are selected to operate on the same slope characteristics which is of importance since threshold detectors behave differently for different slope characteristics. Accordingly, since detectors 115a–b operate on the same portion of the slope characteristics independent of the polarity of input signals from stage 120, then a precision value of the peak time is produced independent of any hysteresis effects.

For purposes of illustration, as shown in FIG. 6B, the leading edge of trigger pulse 20 occurs coincidentally with the time of the peak of signal 100b. However, it will be understood that signal 11 is the signal applied by stage 120 while pulse 22 occurs at the output of output stage 170. As a result of the propagation delays of the components between these two signals in peak time detector 14, the leading edge of pulse 20 occurs at a predetermined propagation time delay (as for example, 40 nanoseconds) from the peak of signal 11 as shown in FIG. 2. Thus, pulse 20 actually occurs at time $t_p$. This propagation delay is precisely compensated for by delay line 16 which applies delayed input signal 11a to circuit 18. The peak time of signal 11a occurs exactly at the leading edge of trigger pulse 20 and strobe pulse 45.

What is claimed is:

1. A system for sampling an unknown signal only for a single time interval in which the resultant sampled value is first stored for a short term and then transferred to long term storage comprising
   first and second amplifier means,
   short term storage means connected to an input of said first amplifier means having said sampled signal applied thereto,
   first switching means when switched on for providing a first negative feedback loop for said first amplifier means,
   a feedback circuit for said first and second amplifier means,
   second switching means connected between said first and second amplifier means when switched on for providing a second negative feedback loop through said feedback circuit for said first and second amplifier means,
   long term storage means connected to an input of said second amplifier means, and
   means for switching (1) said first switching means off and said second switching means on to transfer stored sampled signal from said short term to said long term storage means and (2) said second switching means off and said first switching means on whereby a negative feedback loop is continuously provided for said first amplifier means thereby to maintain said first amplifier means in an unsaturated state.

2. The system of claim 1 in which there is provided clear means for rapid discharge of said short term storage means after said transfer of stored sampled signal.

3. The system of claim 1 in which there is provided a complementary Darlington pair of semiconductor devices having an input and an output, said second switching means being connected between a terminal of an input device of said pair and said pair output whereby current flow through an output device of said pair is of substantially large value for rapid charge of said long term storage means when said second switching means is on thereby to transfer stored sampled signal from said short term to said long term storage means in which said short term stored signal is of more positive value than that previously stored on said long term storage means.

4. The system of claim 3 in which said input of said pair is connected to an output of said first amplifier means.

5. The system of claim 4 in which there is provided an additional complementary Darlington pair of semiconductor devices to transfer stored sampled signals of more negative value than that previously stored on said long term storage means.

6. The system of claim 1 in which said first and second switching means each comprise a field effect transistor.

7. A system for sampling an unknown signal only for a single time interval in which the sampled value is first stored for a short term and then transferred to long term storage comprising
first and second amplifier means,
short term capacitive storage means connected to an input of said first amplifier means,
means for sampling only at a single time said unknown signal and for applying said sampled signal to said short term storage means,
first switching means connected between an output and said input of said first amplifier means,
long term capacitive storage means connected to an input of said second amplifier means,
second switching means connected between said long term storage means and said output of said first amplifier means,
a feedback circuit connected between an output of said second amplifier means and said first amplifier input, and
means for switching (1) during a first state said first switching means off and said second switching means on to close a negative feedback loop through said second switching means and said feedback circuit to transfer stored sampled signal from said short to said long term storage means and (2) during a second state said second switching means off and said first switching means on to close a negative feedback loop for said first amplifier means through said first switching means whereby a negative feedback loop is continuously provided for said first amplifier means thereby to maintain said first amplifier means in an unsaturated state.

8. The system of claim 7 in which said first and second switching means comprise a pair of complementary field effect transistors whereby during said second state said second switching means provides a substantially high impedance connected to said long term storage means for maintaining the charge thereon.

9. The system of claim 7 in which there is provided a complementary Darlington pair of transistors having an input and an output, said second switching means being connected between an emitter of an input transistor of said pair and said output of said pair, said input of said pair being connected to said output of said first amplifier means whereby during said first state current flow through an output transistor of said pair is of substantial large value for rapid charge of said long term storage means, said current flow being discontinued prior to said switching from said first to said second state thereby to avoid overshoot.

10. The system of claim 9 in which there is provided an additional complementary Darlington pair of transistors for transferring stored sample signals of opposite polarity to that of said first named pair.

11. A system for accurate and rapid charge and discharge of a storage capacitor to a predetermined potential comprising
input means for applying said predetermined potential,
switching means connected between said input means and said storage capacitor,
a first complementary Darlington pair of transistors having an input NPN and an output PNP transistor for producing charging current for said storage capacitor, a second complementary Darlington pair of transistors having an input PNP and an output NPN transistor for providing discharging current for said storage capacitor, each of said pairs having an output, the base of each input transistor of each pair being connected to said input means, said switching means being connected between the emitters of each of said input transistors and each output of said pairs,
means for applying switching signals to (1) turn off said switching means thereby to maintain the potential stored on said storage capacitor and (2) turn on said switching means to provide as a function of the difference between said stored potential and said predetermined potential either (a) a charging path for said storage capacitor and turning on said first pair or (b) a discharging path for said capacitor and turning on said second pair whereby during said charging or discharging of said storage capacitor current flow through one of said output transistors is of substantially large value for rapid charge or discharge of said storage capacitor.

12. The system of claim 11 in which there is provided first and second amplifier means, a negative feedback loop connected between an output of said second amplifier means and an input of said first amplifier means, said first amplifier being connected between said input means and said bases of said input transistors, said outputs of said pairs being connected to said second amplifier means whereby with said switching means turned on there is provided a closed negative feedback loop.

13. The system of claim 12 in which there is provided an additional switching means connected between said output of said first amplifier means and said feedback loop, said switching signals being applied to said additional switching means for turning said additional switching means on and off when said switching means is turned off and on respectively to provide a negative feedback loop continuously maintained around said first amplifier means.

14. The system of claim 13 in which said input means samples an unknown signal only for a single time interval.

15. The system of claim 11 in which there is provided means for controlling said applying means to maintain said switching means turned on until said current flow through said output transistor has discontinued thereby to avoid overshoot.

* * * * *